US007793297B2

(12) United States Patent
Aggarwal et al.

(10) Patent No.: US 7,793,297 B2
(45) Date of Patent: Sep. 7, 2010

(54) INTELLIGENT RESOURCE PROVISIONING BASED ON ON-DEMAND WEIGHT CALCULATION

(75) Inventors: Manishkumar Aggarwal, Mississauga (CA); Baldev Singh Soor, Markham (CA)

(73) Assignee: International Business Machines Corporation, Armonk, NY (US)

( * ) Notice: Subject to any disclaimer, the term of this patent is extended or adjusted under 35 U.S.C. 154(b) by 1531 days.

(21) Appl. No.: 11/117,925

(22) Filed: Apr. 29, 2005

(65) Prior Publication Data

US 2006/0248372 A1    Nov. 2, 2006

(51) Int. Cl.
*G06F 9/46* (2006.01)
*G06F 15/173* (2006.01)

(52) U.S. Cl. .................. 718/104; 718/105; 709/226
(58) Field of Classification Search .............. 718/1–108; 709/200, 226
See application file for complete search history.

(56) References Cited

U.S. PATENT DOCUMENTS

| 6,338,072 | B1 | 1/2002 | Durand et al. ............... 707/205 |
| 6,744,767 | B1 | 6/2004 | Chiu et al. ............. 370/395.21 |
| 6,775,231 | B1 | 8/2004 | Baker et al. ............. 370/230.1 |
| 6,850,892 | B1 | 2/2005 | Shaw ........................... 705/8 |
| 2003/0037145 | A1 | 2/2003 | Fagan .......................... 709/226 |
| 2003/0120780 | A1* | 6/2003 | Zhu et al. .................... 709/226 |
| 2004/0073673 | A1 | 4/2004 | Santos et al. ................. 709/226 |
| 2004/0136379 | A1 | 7/2004 | Liao et al. .............. 370/395.21 |
| 2004/0215578 | A1 | 10/2004 | Das .............................. 705/77 |
| 2005/0041580 | A1 | 2/2005 | Petrovykh ................... 370/229 |
| 2005/0055694 | A1 | 3/2005 | Lee ............................. 718/100 |
| 2005/0149940 | A1* | 7/2005 | Calinescu et al. ........... 718/104 |
| 2005/0228856 | A1* | 10/2005 | Swildens et al. ............ 709/200 |
| 2006/0026599 | A1* | 2/2006 | Herington et al. ........... 718/105 |

OTHER PUBLICATIONS

Peh et al. "The Design and Development of a Distributed Scheduler Agent" Algorithms and Architectures for Parallel Processing, 1996. ICAPP '96. 1996 IEEE.*
Moore et al. "Managing Mixed-Use Clusters with Cluster-on-Demand"; Internet Systems and Storage Group Software Architecture for Internet-scale Computing; Nov. 20, 2002; pp. 1-12.*

* cited by examiner

*Primary Examiner*—Meng-Ai An
*Assistant Examiner*—Willy W Huaracha
(74) *Attorney, Agent, or Firm*—Yee & Associates, P.C.; Jeffrey S. LaBaw

(57) ABSTRACT

A method, apparatus, and computer program product in a data processing system for intelligent resource provisioning based on on-demand weight calculation. Resource weights are defined for an application cluster. If the application cluster requests a set of additional resources, an on-demand weight for each resource in a resource pool is calculated and the resource with the highest on-demand weight is provisioned for the requesting application cluster. If resources need to be de-provisioned from the application cluster, an on-demand weight for each resource in the application cluster is calculated and the resource with the lowest on-demand weight for the application cluster is de-provisioned.

15 Claims, 3 Drawing Sheets

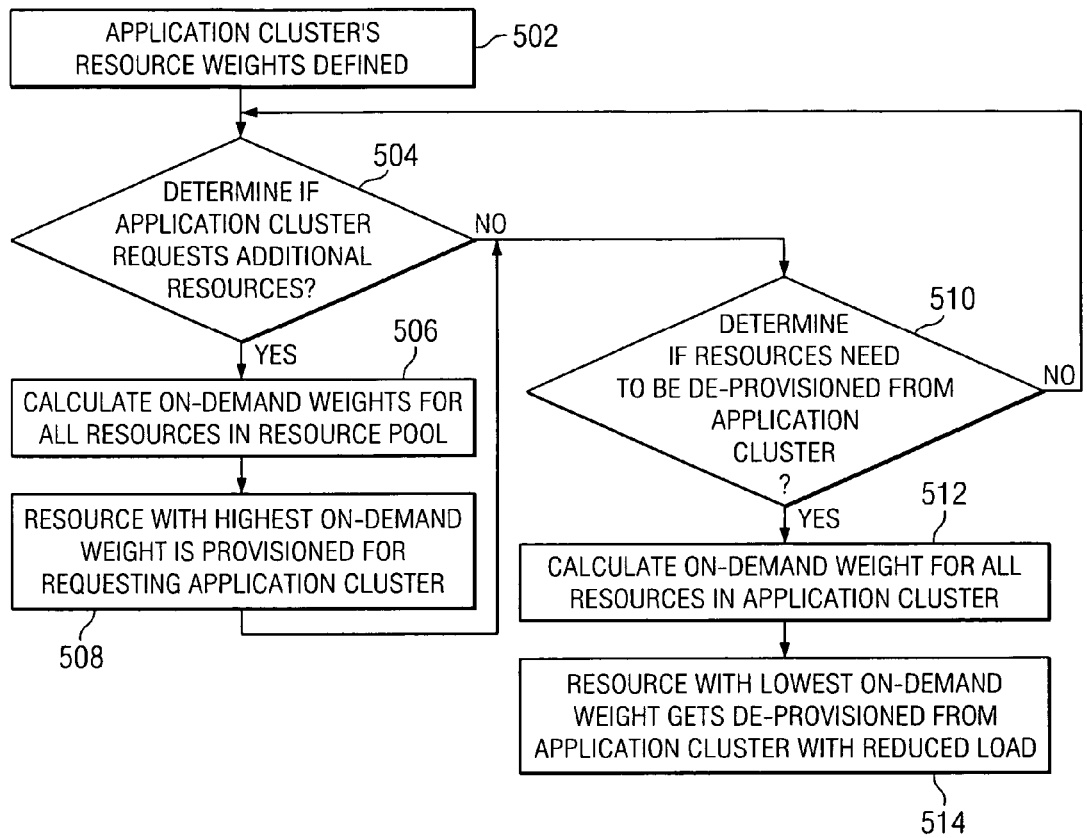
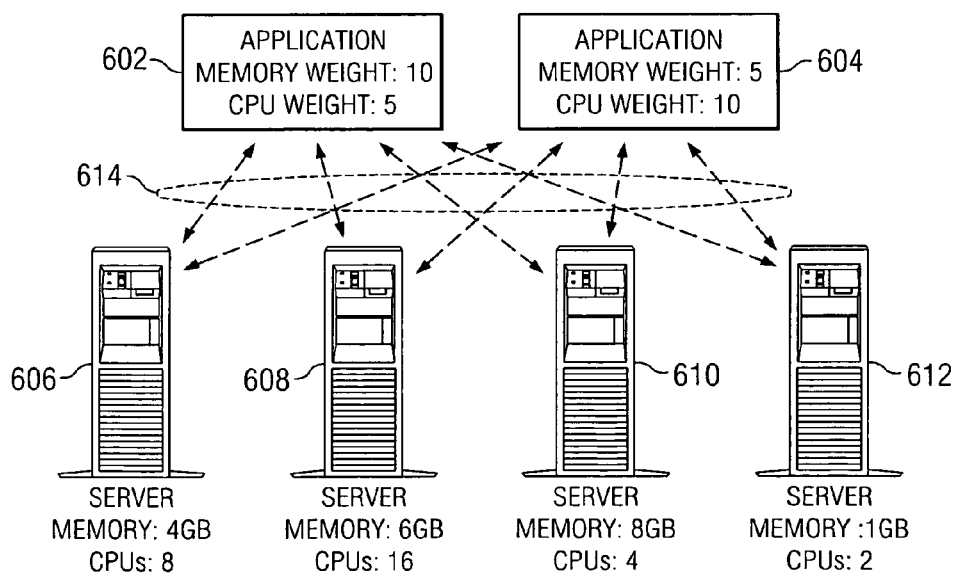

INTELLIGENT RESOURCE PROVISIONING BASED ON ON-DEMAND WEIGHT CALCULATION

BACKGROUND OF THE INVENTION

1. Technical Field

The present invention relates generally to an improved data processing system and, in particular, to a method, system and computer program product for optimizing performance in a data processing system. Still more particularly, the present invention provides a method, system, and computer program product for intelligent resource provisioning based on on-demand weight calculation.

2. Description of Related Art

Provisioning is the process of providing users with access to data and technology resources. The term typically is used in reference to a business organization's resource management. Provisioning can be thought of as the duties in a business organization, where users are given access to applications, systems, and databases, and users are appropriated hardware resources, such as computers. When used in reference to a client, provisioning can be thought of as a form of customer service.

An application is a complete, self-contained program, or group of programs, that is designed to perform a specific function directly for a user. Common examples of application software (also called user programs) include editors for various kinds of database programs, spreadsheets, documents, word processors, and text formatters. Network applications include clients such as those for File Transfer Protocol, electronic mail, telnet and World Wide Web.

An application cluster is when an application (e.g., a database) is installed across multiple servers (e.g., computers which provide some service for other computers connected to it via a network). A shared server method of clustering applications increases scalability, the ability of an application to continue to function well when it (or its context) is changed in size or volume in order to meet a user need. The resealing can be of the product itself—for example, a line of computer systems of different sizes in terms of number of Central Processing Units (CPU's), storage, RAM, and so forth. Provisioning resources for an application cluster increase scalability because servers can easily be added or subtracted to meet current user needs. This provisioning also improves availability, because if one server fails, another can assume its workload. Additionally, provisioning resources for an application cluster allows an application to take full advantage of a larger operating system in terms of performance, such as user response time and so forth.

For example, a news organization may have a website that normally uses 100 servers, with 5 to 15 additional servers provisioned for the website application cluster during peak times. If a highly significant news event occurs, the 100 additional servers that the news organization's human resource department normally uses may need to be temporarily provisioned to the website application cluster in order prevent the application from becoming overloaded beyond its capacity to respond to client requests.

Currently, the provisioning solutions in the marketplace use a simple method of determining the resource to be provided for an application cluster. This method does not take into consideration the characteristics of the resources sitting idle in a resource pool waiting to be provisioned or the nature of the application cluster that may request a resource provisioning. There is no distinction made in provisioning a resource between a CPU-intensive application and a memory-intensive application. This leads to the provisioning of an inferior resource for an application—such as provisioning a single CPU system for an application cluster multiple times to satisfy demand of a CPU-intensive application while a more powerful 8 CPU system sits idle in the resource pool.

Therefore, it would be advantageous to have an improved method, system, and computer program product for intelligent resource provisioning based on on-demand weight calculation.

SUMMARY OF THE INVENTION

The present invention provides a method, system, and computer program product in a data processing system for intelligent resource provisioning based on on-demand weight calculation. Resource weights are defined for an application cluster. If the application cluster requests a set of additional resources, an on-demand weight for each resource in a resource pool is calculated and the resource with the highest on-demand weight is provisioned for the requesting application cluster. If resources need to be de-provisioned from the application cluster, an on-demand weight for each resource in the application cluster is calculated and the resource with the lowest on-demand weight for the application cluster is de-provisioned.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a block diagram of the process for intelligent resource provisioning based on on-demand weight calculation, according to a preferred embodiment of the present invention; and FIG. 6 is a block diagram of specific application and resource examples for intelligent resource provisioning based on on-demand weight calculation, according to a preferred embodiment of the present invention.

DETAILED DESCRIPTION OF THE PREFERRED EMBODIMENT

Figure 1:
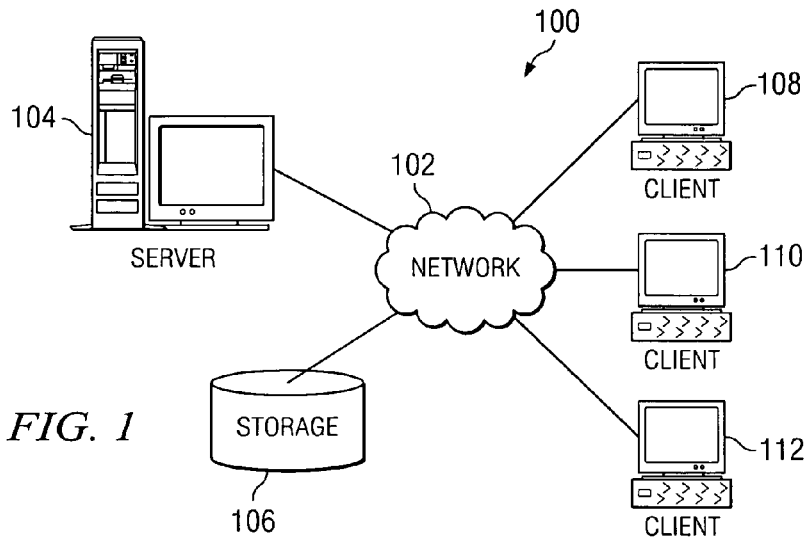
FIG. 1 is a pictorial representation of a data processing system in which the present invention may be implemented, according to a preferred embodiment of the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
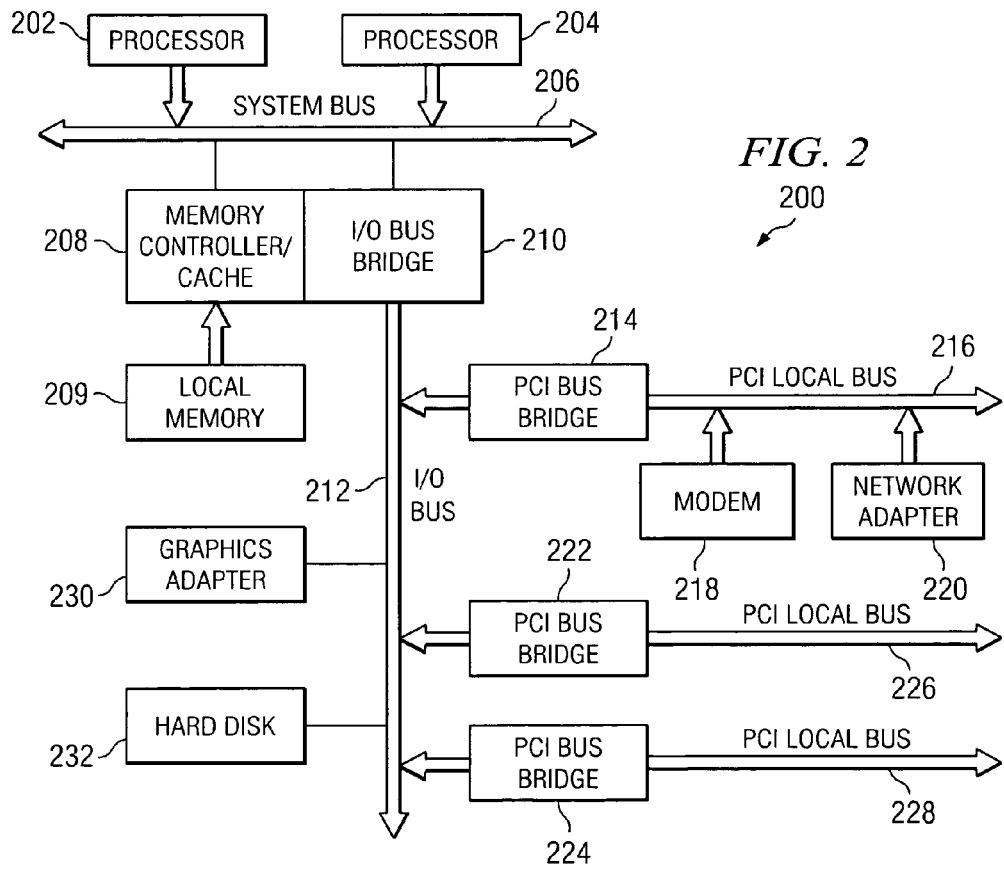
FIG. 2 is a block diagram of a data processing system that may be implemented as a server in which the present invention may be implemented, according to a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or the LINUX operating system.

Figure 3:
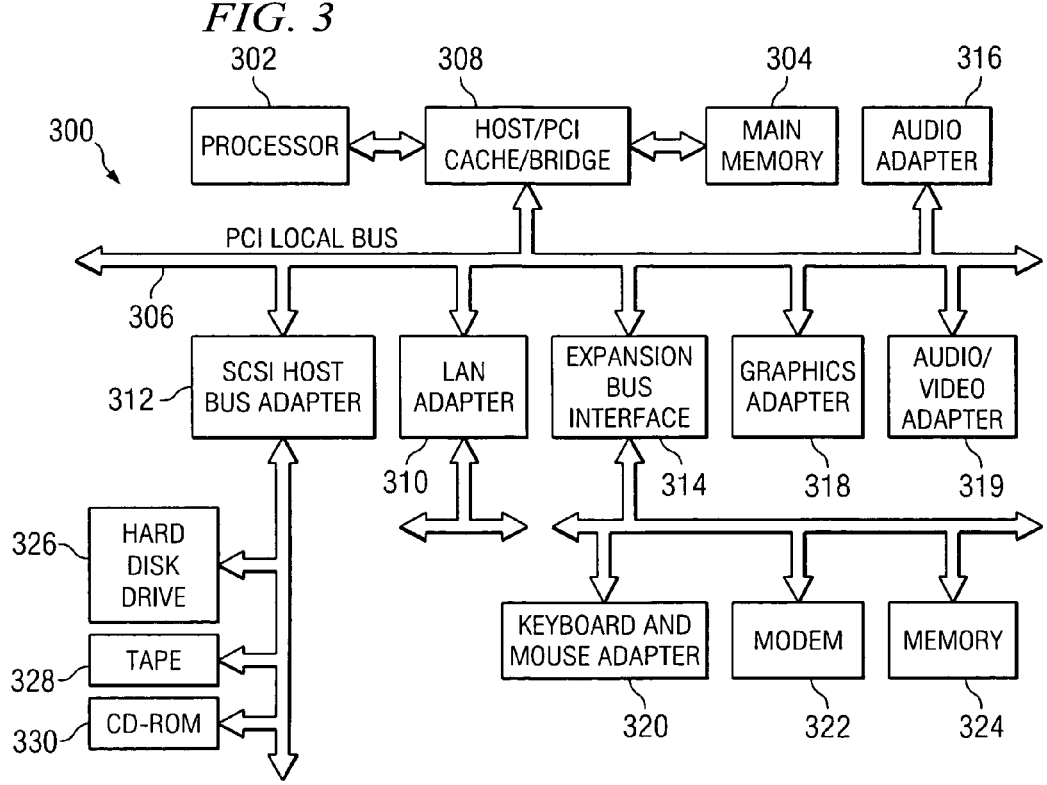
FIG. 3 is a block diagram illustrating a data processing system in which the present invention may be implemented, according to a preferred embodiment of the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention is a method, system and computer program product for intelligent resource provisioning based on on-demand weight calculation. The mechanism of the present invention may be executed on a server, such as server 104 in FIG. 1, communicating through a network, such as network 102, with clients, such as client 108, client 110, and client 112. The mechanism of the present invention provides for intelligent resource provisioning that takes into account the nature of the application cluster (CPU-intensive or memory intensive) requesting the resource, and the characteristics of the resources available in the resource pool to provision a best-fit resource. An on-demand weight-based algorithm is used to provision resources for an application cluster. The algorithm calculates the on-demand weight at provisioning time and uses the results to decide which resources or systems get provisioned. This results in higher usage of the most powerful systems in the resource pool, improving the efficiency of on-demand provisioning. This also saves precious time during high demand conditions by provisioning a small number of more powerful servers for an application cluster, rather than provisioning a large number of inferior systems.

Figure 4:
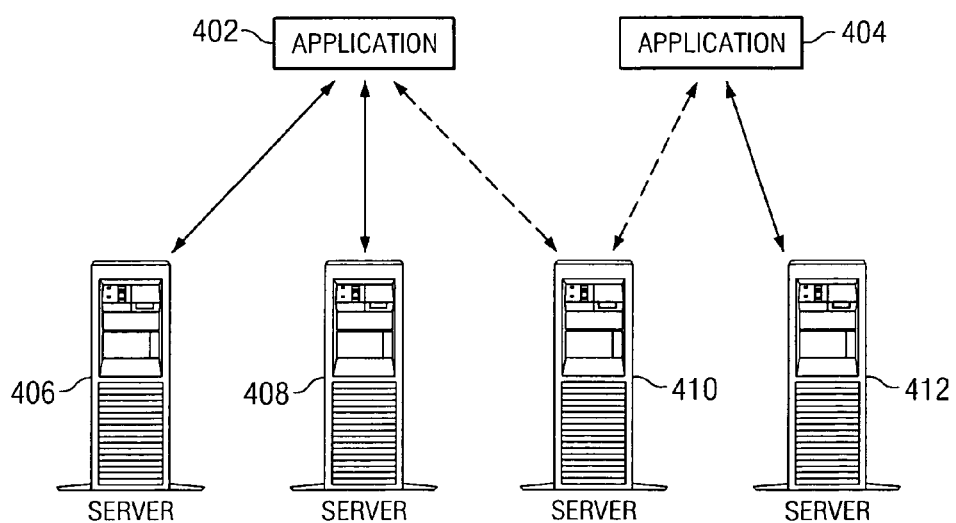
FIG. 4 is a block diagram of general application and resource examples for intelligent resource provisioning based on on-demand weight calculation, according to a preferred embodiment of the present invention.

FIG. 4 is a block diagram of general application and resource examples for intelligent resource provisioning based on on-demand weight calculation, according to a preferred embodiment of the present invention. In this illustrative example, in FIG. 4, there are two application clusters, application cluster 402 and application cluster 404. Both application clusters draw resources from the same resource pool, which includes server 406, server 408, server 410, and server 412. In this example, server 406, server 408 are provisioned for application cluster 402, while server 412 is provisioned for application cluster 404. If the load on application cluster 402 increases and an additional system need to be provisioned, server 410 may also be provisioned for application cluster 402. Likewise, if the load on application cluster 404 increases and an additional system need to be provisioned, server 410 may also be provisioned for application cluster 404. If the load on an application cluster reduces, resources may need to be de-provisioned from the application cluster. If the load on application cluster 402 reduces and an additional system need to be de-provisioned, server 408 may be de-provisioned from application cluster 402.

FIG. 5 is a block diagram of process for intelligent resource provisioning based upon on-demand weight calculation, according to a preferred embodiment of the present invention. Typically, the hardware dependencies of an application's performance are the memory and the CPU of the physical or virtual system on which they are running. Using the mechanism of the present invention, the application cluster's resource weights are defined during the modeling process which provides information on the nature of the application, as shown in step 502. Possible choices may include memory weight and processor weight. Memory weight is a number which represents the effect of memory on the performance of the application cluster, relative to the CPU. Processor weight is a number which represents the effect of the CPU on the performance of the application cluster, relative to the memory.

The modeling of resource weights is based upon the user's initial estimates for an application cluster, with the estimates refined for greater accuracy based upon either simulations or real-time experience. Typically, database programs are processor intensive applications while web server programs are memory intensive applications. Following the assignment of resource weights for an application cluster based on a user's initial estimates, the user may use a simulator with a load balancer to refine the resource weights, such as loading a website application into a simulator and evaluating the changes in the application cluster's performance when an additional 10,000 hits to the website are simulated. Based upon the change in the applications cluster's simulated performance under such conditions, the user may adjust the resource weights assigned. Additionally, the user may further adjust the resource weights assigned after the application cluster, such as a website application, is on-line. For example, if the load on an application cluster is 75% before the application cluster is provisioned with a system that has more memory than most other systems, the user may refine the application cluster's resource weight differently depending on whether the load drops to 60% or 40%.

For an example of resource weights, a memory intensive application may have an initial memory weight of ten and an initial processor weight of five, while a CPU intensive application may have an initial memory weight of five and an initial processor weight of ten. This example's numbers and options are typical values with which to start and may be adjusted based on application requirements, user simulations and user experience.

When a resource, either physical or virtual, is added into a resource pool, in addition to the default attributes, like Internet Protocol address and Media Access Control address, the resource will have characteristics defined for the amount of memory in the resource and the number of CPU's in the resource. The mechanism of the present invention uses these resource characteristics to intelligently provision resources.

When an application cluster's load increases, the application cluster may request an additional resource from the resource pool. During run-time, the mechanism of the present invention determines if an application cluster is requesting a set of additional resources, wherein the set includes one or more resources, as shown in step 504. If an application cluster is requesting a set of additional resources, the provisioning system of the present invention will use the resource characteristics defined for the amount of memory and the number of CPU's and the resource weights of the application cluster to calculate the on-demand weights for all of the resources in the resource pool, as shown in step 506. The on-demand weights are calculated by using an equation, and the following equation is a possible example of such an equation.

On-demand weight=[(Memory weight of application×amount of memory in the resource)+(Processor weight of application×Number of CPU's in the resource)]

In this example equation, the memory weight of an application is multiplied by the amount of memory in a resource, such that the product of this multiplication is higher when both memory factors are high. Additionally, the processor weight of an application is multiplied by the amount of processors in a resource, such that the product of this multiplication is higher when both processor factors are high. The on-demand weight is the summation of the products from the two multiplications. When such an equation is applied to a memory intensive application and a resource with a large amount of memory, the result will be higher than the result for the same resource combined with a similar processor intensive application. In contrast, when such an equation is applied to a processor intensive application and a resource with a large amount of processors, the result will be higher than the result for the same resource combined with a similar memory intensive application. Therefore, all other factors being equal, resources with a large amount of memory will be tend to be provisioned for applications that are memory intensive while resources with a large amount of processors will tend to be provisioned for applications that are processor intensive.

The end result of the equations calculations is that the resource with the highest on-demand weight is provisioned for the requesting application cluster by the mechanism of the present invention, as shown in step 508.

When the load on an application cluster reduces, resources may need to be de-provisioned from the application cluster. During run-time, the mechanism of the present invention determines if a set of resources need to be de-provisioned from the application cluster, wherein the set of resources includes one or more resources, as shown in step 510. If a set of resources need to be de-provisioned from the application cluster, the reverse algorithm is applied to calculate the on-demand weight for all the resources in the application cluster, as shown in step 512. The set of resources with the lowest on-demand weight gets de-provisioned from the application cluster with the reduced load, as shown in step 514.

FIG. 6 is a block diagram of specific application and resource examples for intelligent resource provisioning based on on-demand weight calculation, according to a preferred embodiment of the present invention. In this illustrative example, in FIG. 6, there are two application clusters. Application cluster 602 is memory intensive and application cluster 604 is processor intensive. Both application clusters draw resources from the same resource pool, which includes server 606, server 608, server 610, and server 612. In this example, application cluster 602 is memory intensive, as its memory weight is 10 and its CPU weight is only 5, whereas application cluster 604 is processor intensive, as its memory weight is only 5 and its processor weight of 10. Server 606 has 4 gigabytes of memory and 8 CPU's, server 608 has 6 gigabytes of memory and 16 CPU's, server 610 has 8 gigabytes of memory and 4 CPU's, and server 612 has 1 gigabyte of memory and 2 CPU's. Possible provisioning 614 indicates that any server can be provisioned for any application.

When the load on application cluster 602 increases and additional systems need to be provisioned, then using the algorithm defined above, the systems will get provisioned in the following order based on their on-demand weights, and availability. Based upon the examples in FIG. 5, the calculated on-demand weight for server 608 is equal to the sum of two particular products. The first product is the memory weight of 10 for application cluster 602 multiplied by the amount of memory, 6 gigabytes, for server 608. Therefore, the first calculated product is 60, equal to a memory weight of 10 multiplied by 6 gigabytes. The second product is the processor weight of 5 for application cluster 602 multiplied by the number of processors, 16, for server 608. Therefore, the second calculated product is 80, equal to a processor weight of 5 multiplied by 16 processors. The on-demand weight for Server 608 equals the sum of the two calculated products, which in this example is 140, the sum of 60 and 80.

Based on the same equation for the other examples:

On-demand weight for Server 610=[(10×8)+(5×4)]
=120

On-demand weight for Server 606=[(10×4)+(5×8)]
=80

On-demand weight for Server 612=[(10×1)+(5×2)]
=20

In contrast, when the load on application 604 increases and additional systems need to be provisioned, then using the algorithm defined above, the systems will get provisioned in the following order based on their on-demand weights, and availability.

On-demand weight for Server 608=[(5×6)+(10×16)]
=190

On-demand weight for Server 606=[(5×4)+(10×8)]
=120

On-demand weight for Server 610=[(5×8)+(10×4)]
=80

On-demand weight for Server 612=[(5×1)+(10×2)]
=25

For both application 602 and application 604, the on-demand weight is highest for server 608, which is the highest quality server because it has 6 gigabytes of memory and 16 CPU's, and the on-demand weight is lowest for server 612, which is the lowest quality server because it has only 1 gigabyte of memory and 2 CPU's. These results demonstrate the achievement of one goal for the present invention, higher usage of the most powerful systems in the resource pool.

The results also indicate that application clusters favor servers that are a best-fit for each type of application cluster. Application cluster 602 is memory intensive, and gave higher priority to server 610 than to server 606. This is because server 610 has 8 gigabytes of memory in contrast to server 606, which has only 4 gigabytes of memory. In contrast, application cluster 604 is processor intensive, and gave higher priority to server 606 than to server 610. This is because server 606 has 8 processors in contrast to server 610, which has only 4 processors. These results demonstrate the achievement of another goal for the present invention, the provisioning of best-fit resources.

Therefore, the method of the present invention, described and illustrated in an example above, provides intelligent resource provisioning based on on-demand weight calculation, which results the provisioning of best-fit resources and in higher usage of the most powerful systems in the resource pool, thus saving precious time during high demand conditions.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for intelligent resource provisioning based on on-demand weight calculation, the method comprising:

defining a plurality of resource weights for an application cluster, wherein the application cluster is an application installed across multiple data processing systems;

determining if the application cluster requests a set of additional resources;

responsive to the application cluster requesting a set of additional resources, calculating an on-demand weight for each of a plurality of resources in a resource pool;

responsive to calculating an on-demand weight for each of a plurality of resources in a resource pool, provisioning a set of resources based upon a highest on-demand weight for the requesting application cluster;

determining if a set of resources needs to be de-provisioned from the application cluster;

responsive to determining a set of resources needs to be de-provisioned from the application cluster, calculating an on-demand weight for each of a plurality of resources in the set of resources in the application cluster; and responsive to calculating an on-demand weight for each of a plurality of resources in the set of resources in the application cluster, de-provisioning the set of resources based upon a lowest on-demand weight for the application cluster, wherein the on-demand weight for a given resource of the plurality of resources is dependent upon an effect of the given resource on performance of the application cluster and an amount of the given resource, and wherein the plurality of resource weights for the application cluster includes at least one of (i) a memory weight based on a memory performance effect that memory has on the application cluster, and (ii) a processor weight based on a processor performance effect that a processor has on the application cluster.

2. The method of claim 1, wherein the on-demand weight for each of the plurality of resources in the resource pool is a relative importance weight that is calculated based upon a resource characteristic for an amount of memory in each of the plurality of resources in the resource pool.

3. The method of claim 1, wherein the on-demand weight for each of the plurality of resources in the resource pool is a relative importance weight that is calculated based upon a resource characteristic for an amount of processors in each of the plurality of resources in the resource pool.

4. The method of claim 1, wherein the on-demand weight for a given one of the plurality of resources is calculated using the memory weight of an application, an amount of memory for the given one of the plurality of resources, the processor weight of the application and a number of processors for the given one of the plurality of resources.

5. The method of claim 4, wherein the on-demand weight for a given resource of the plurality of resources is calculated as follows: on-demand weight=[(Memory weight of application×amount of memory in the given resource)+(Processor weight of application×Number of CPU's in the given resource)].

6. A data processing system for intelligent resource provisioning based on on-demand weight calculation, the data processing system comprising:

defining means for defining a plurality of resource weights for an application cluster, wherein the application cluster is an application installed across multiple data processing systems;

determining means for determining if the application cluster requests a set of additional resources;

responsive to the application cluster requesting a set of additional resources, calculating means for calculating an on-demand weight for each of a plurality of resources in a resource pool;

responsive to calculating an on-demand weight for each of a plurality of resources in a resource pool, provisioning means for provisioning a set of resources based upon a highest on-demand weight for the requesting application cluster;

determining means for determining if a set of resources needs to be de-provisioned from the application cluster;

responsive to determining a set of resources needs to be de-provisioned from the application cluster, calculating means for calculating an on-demand weight for each of a plurality of resources in the set of resources in the application cluster; and responsive to calculating an on-demand weight for each of a plurality of resources in the set of resources in the application cluster, de-provisioning means for de-provisioning the set of resources based upon a lowest on-demand weight for the application cluster, wherein the on-demand weight for a given resource of the plurality of resources is dependent upon an effect of the given resource on performance of the application cluster and an amount of the given resource, and wherein the plurality of resource weights for the application cluster includes at least one of (i) a memory weight based on a memory performance effect that memory has on the application cluster, and (ii) a processor weight based on a processor performance effect that a processor has on the application cluster.

7. The data processing system of claim 6, wherein the on-demand weight for each of the plurality of resources in the resource pool is a relative importance weight that is calculated based upon a resource characteristic for an amount of memory in each of the plurality of resources in the resource pool.

8. The data processing system of claim 6, wherein the on-demand weight for each of the plurality of resources in the resource pool is a relative importance weight that is calculated based upon a resource characteristic for an amount of processors in each of the plurality of resources in the resource pool.

9. The data processing system of claim 6, wherein the on-demand weight for a given one of the plurality of resources is calculated using the memory weight of an application, an amount of memory for the given one of the plurality of resources, the processor weight of the application and a number of processors for the given one of the plurality of resources.

10. The data processing system of claim 9, wherein the on-demand weight for a given resource of the plurality of resources is calculated as follows: on-demand weight= [(Memory weight of application×amount of memory in the given resource)+(Processor weight of application×Number of CPU's in the given resource)].

11. A computer program product on a computer-readable, recordable-type medium for use in a data processing system for intelligent resource provisioning based on on-demand weight calculation, the computer program product comprising:

first instructions for defining a plurality of resource weights for an application cluster, wherein the application cluster is an application installed across multiple data processing systems;

second instructions for determining if the application cluster requests a set of additional resources;

responsive to the application cluster requesting a set of additional resources, third instructions for calculating an on-demand weight for each of a plurality of resources in a resource pool;

responsive to calculating an on-demand weight for each of a plurality of resources in a resource pool, fourth instructions for provisioning a set of resources based upon a highest on-demand weight for the requesting application cluster;

fifth instructions for determining if a set of resources needs to be de-provisioned from the application cluster;

responsive to determining a set of resources needs to be de-provisioned from the application cluster, sixth instructions for calculating an on-demand weight for each of a plurality of resources in the set of resources in the application cluster; and responsive to calculating an on-demand weight for each of a plurality of resources in the set of resources in the application cluster, seventh instructions for de-provisioning the set of resources based upon a lowest on-demand weight for the application cluster, wherein the on-demand weight for a given resource of the plurality of resources is dependent upon an effect of the given resource on performance of the application cluster and an amount of the given resource, and wherein the plurality of resource weights for the application cluster includes at least one of (i) a memory weight based on a memory performance effect that memory has on the application cluster, and (ii) a processor weight based on a processor performance effect that a processor has on the application cluster.

12. The computer program product of claim 11, wherein the on-demand weight for each of the plurality of resources in the resource pool is a relative importance weight that is calculated based upon a resource characteristic for an amount of memory in each of the plurality of resources in the resource pool.

13. The computer program product of claim 11, wherein the on-demand weight for each of the plurality of resources in the resource pool is a relative importance weight that is calculated based upon a resource characteristic for an amount of processors in each of the plurality of resources in the resource pool.

14. The computer program product of claim 11, wherein the on-demand weight for a given one of the plurality of resources is calculated using the memory weight of an application, an amount of memory for the given one of the plurality of resources, the processor weight of the application and a number of processors for the given one of the plurality of resources.

15. The computer program product of claim 14, wherein the on-demand weight for a given resource of the plurality of resources is calculated as follows: on-demand weight= [(Memory weight of application×amount of memory in the given resource)+(Processor weight of application×Number of CPU's in the given resource)].

* * * * *